United States Patent
Eisenbraun

(12) 
(10) Patent No.: US 6,320,962 B1
(45) Date of Patent: Nov. 20, 2001

(54) ELECTRICALLY OPERATED OBJECT CRADLE

(76) Inventor: Kenneth D. Eisenbraun, 269 Executive Dr., Troy, MI (US) 48083

( * ) Notice: Subject to any disclaimer, the term of this patent is extended or adjusted under 35 U.S.C. 154(b) by 0 days.

(21) Appl. No.: 09/467,331

(22) Filed: Dec. 20, 1999

Related U.S. Application Data

(63) Continuation-in-part of application No. 08/802,523, filed on Feb. 20, 1997, now Pat. No. 6,035,036, which is a continuation of application No. 08/520,707, filed on Aug. 29, 1995, now abandoned.

(51) Int. Cl.⁷ .................................................. H04M 1/00
(52) U.S. Cl. ............................ 379/446; 379/454; 379/455
(58) Field of Search .................................. 379/446, 426, 379/455, 454, 449; 248/316.4, 281

(56) References Cited

U.S. PATENT DOCUMENTS

| | | | |
|---|---|---|---|
| 4,582,289 | * 4/1986 | Gibson et al. | 248/316.4 |
| 4,981,277 | 1/1991 | Elwell | 248/311.2 |
| 5,457,745 | * 10/1995 | Wang | 379/446 |
| 5,697,593 | 12/1997 | Bieck | 248/311.2 |
| 5,782,448 | 7/1998 | Withun et al. | 248/311.2 |
| 6,035,036 | * 3/2000 | Eisenbraun et al. | 379/446 |
| 6,076,793 | 6/2000 | Yamamoto | 248/311.2 |
| 6,092,775 | 7/2000 | Gallant | 248/311.2 |

* cited by examiner

*Primary Examiner*—Jack Chiang
(74) *Attorney, Agent, or Firm*—Gifford, Krass, Groh, Sprinkle, Anderson & Citkowski, P.C.

(57) ABSTRACT

A cradle for use in a motor vehicle for gripping and releasing a portable cellular phone or beverage container is shown.

11 Claims, 3 Drawing Sheets

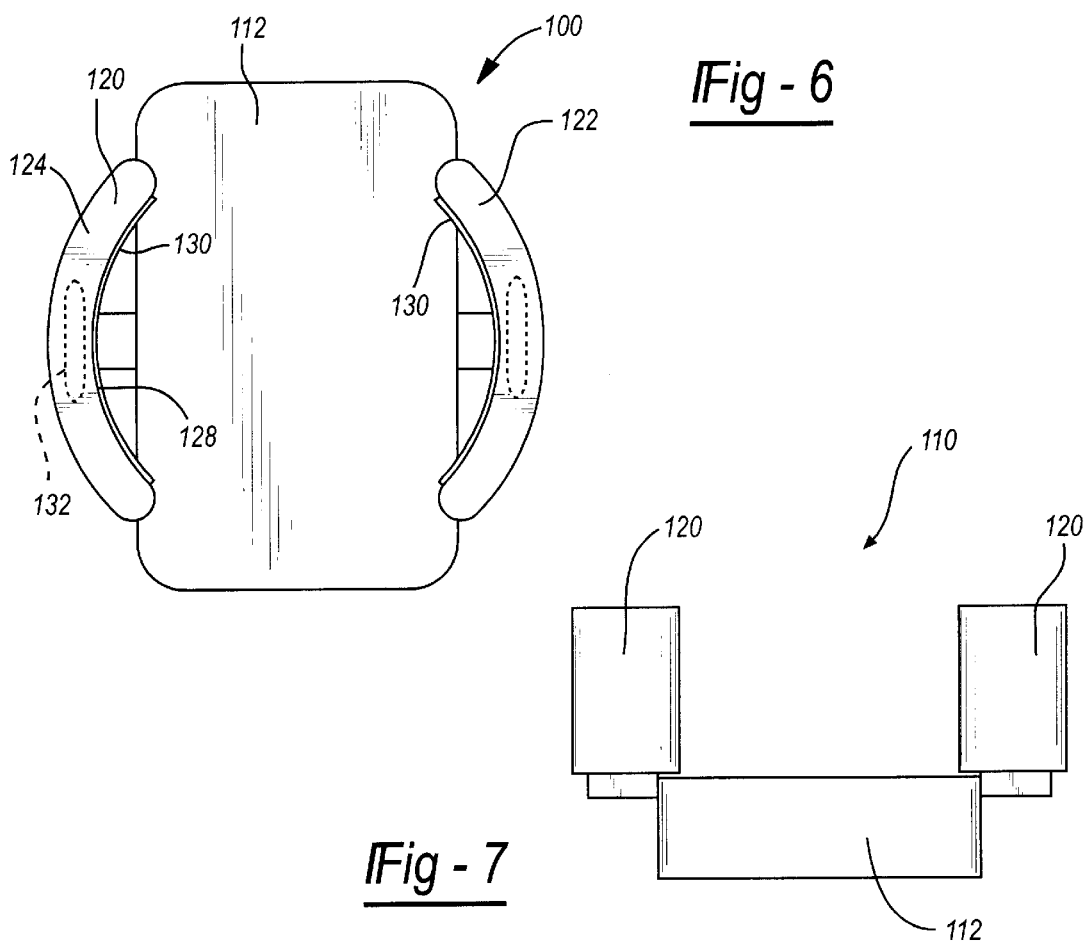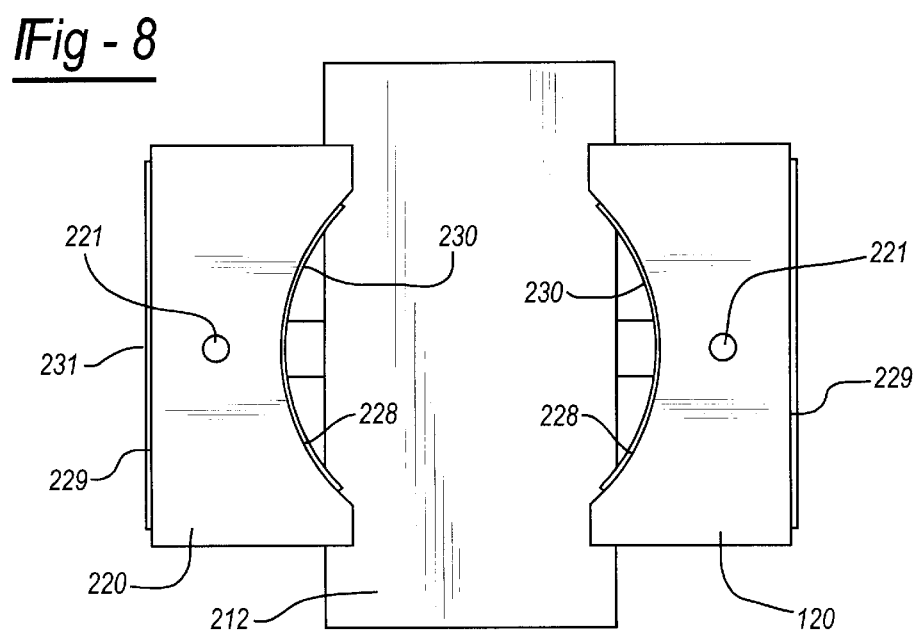

ELECTRICALLY OPERATED OBJECT CRADLE

RELATED APPLICATIONS

This application is a continuation-in-part of U.S. patent application Ser. No. 08/802,523 filed Feb. 20, 1997, and issued as U.S. Pat. No. 6,035,036 on Mar. 7, 2000 which is a file wrapper continuation application of U.S. patent application Ser. No. 08/520,707 filed Aug. 29, 1995, now abandoned and are hereby incorporated by reference.

FIELD OF THE INVENTION

This invention relates to a telephone cradle, more particularly this invention relates to a vehicle mounted telephone cradle for a cellular telephone adapted to grasp an object such as a beverage container including a cup, can or bottle.

BACKGROUND OF THE INVENTION

Since the early 1980s the cellular telephone industry has seen very dramatic growth. Competitive market prices have made it affordable for larger and larger segments of the American population to own a cellular telephone of one type or another. At the commencement of this expansive growth in the cellular telephone industry the most popular type of cellular phone came with its own platform for mounting the phone in the passenger compartment of the phone owner's vehicle. While this innovation in telephonic technology allowed many people to remain in touch with their business or families, the limitation of vehicle mounting still made it impractical for most individuals to own a cellular phone. With further advances in technology the cellular phone soon became transportable in a storage bag allowing free movement outside the vehicle. From the storage bag the phone progressed to a totally independent unit, with the battery and communication equipment compacted into a single hand unit about the size of a standard household handset. The most recent innovations have reduced the hand unit size so as to be able to fit in a person's pocket, briefcase or handbag while retaining all the advantages of their larger ancestors.

This size advantage for the smaller independent units turns into a disadvantage for use in the owner's vehicle, the same place the whole cellular revolution started. As the cellular telephone market moved toward independent hand units and away from being simply car phones, there was less need for phone owners to fit the passenger compartments of their vehicles with a phone mounting platform. This trend has resulted in many modern styles of cellular phones which are not designed for vehicle mounting. The obvious consequence of this development becomes apparent when a phone owner needs to answer or place a call while operating their vehicle. Since there is no longer any phone platform, the phone owner must reach for a phone unit that may have shifted or otherwise moved, during vehicle movement, to an inconvenient location for the phone owner to reach while operating the vehicle. Thus, a need has developed for a phone platform capable of securely holding a wide variety of today's platformless cellular telephones while the phone owner operates his vehicle.

One prior art attempt at a solution to this problem is disclosed in U.S. Pat. No. 5,305,381 issued Apr. 19, 1994 to Wang et al. This patent describes a telephone cradle with two walls extending outward from a base for clamping and holding a cellular telephone on the base. Each wall has a cushion for holding the telephone firmly. The walls are spring loaded and in communication with a ratchet which must be released and finger pressure applied to retract the walls.

A telephone cradle is typically mounted within a vehicle at a location within reach of a vehicle occupant such as the vehicle driver. Thus, the location of a telephone cradle is also well suited for temporarily securing other objects such as a beverage container including a cup, can or bottle.

SUMMARY OF THE INVENTION

The present invention addresses the problem of supplying a universal cradle capable of receiving, holding and releasing portable cellular telephones or beverage containers of various sizes, and providing such a cradle that does not require manual manipulation to grip or release the telephone. A touch of a switch energizes a motor to cause clamping members to open or close to grip or release the phone.

A cradle has a base supporting a first and a second opposing clamping members, each member having a concave clamping surface and an essentially planar clamping surface. The clamping members being pivotally attached to the base such that the clamping surfaces are changed relative to the base. An energy source and actuator button control the slidable motion of at least one of the clamping members to modify the spacing between the members.

An adaptor designed to receive a clamping member of a telephone cradle has a concave surface adapted to engage a beverage container.

The cradle has a base supporting first and second concave clamping members each having a clamping surface facing each other extending outwardly from the base. A motor mounted in the base and activated by a switch slides one or both of the clamping members to move the clamping surfaces toward or away from each other to grip or release a phone placed on the base between the clamping members.

In one embodiment, a single reversing switch is used to open and close the clamping members, changing the plurality of the electrical power supply. In another embodiment two switches are used. One switch, located on the side of the base is used to open or move the clamping members apart. The second switch is preferably located on the base between the clamping members so that when the phone is placed on the base it activates the switch to move the clamping members toward each other to hold the phone.

In a preferred embodiment, an additional pressure sensitive switch or proximity switch is located adjacent one of the clamping surfaces to disconnect the power supply when the clamping members have been moved toward each other and are gripping the phone. A second proximity or limit switch is also preferred to disconnect the power supply when the clamping members are moved apart to their maximum open position.

The power supply can be connected to the vehicle battery or electrical system or it can be from a self-contained battery in the base. A cigarette lighter connection can optionally be used to obtain power from the vehicle electrical system.

In a preferred embodiment, the motor rotates a pinion through a gear reducer and output shaft. The pinion rotates a screw drive through a ring gear, and one of the clamping members is moved by the screw through a nut fixed to the clamping member. In an embodiment where both clamping members are moved toward and away from each other, a rack and pinion drive is used between the members so that a first rack attached to the clamping member moved by the screw drive will rotate a pinion to engage a second rack attached to the other clamping member to move it.

BRIEF DESCRIPTION OF THE DRAWING

The present invention will be more fully understood by reference to the following detailed description of the preferred embodiments of the invention when read in conjunction with the accompanying drawing, in which like reference characters refer to like parts throughout the views, and in which:

FIG. 6 is a top view of an embodiment of the present invention for selectively holding an object;

FIG. 7 is an end view of an object holder adapted to grasp an object; and

FIG. 8 is a top view of an alternative embodiment of the present invention for selectively holding an object.

DETAILED DESCRIPTION OF THE PREFERRED EMBODIMENTS

Figure 1:
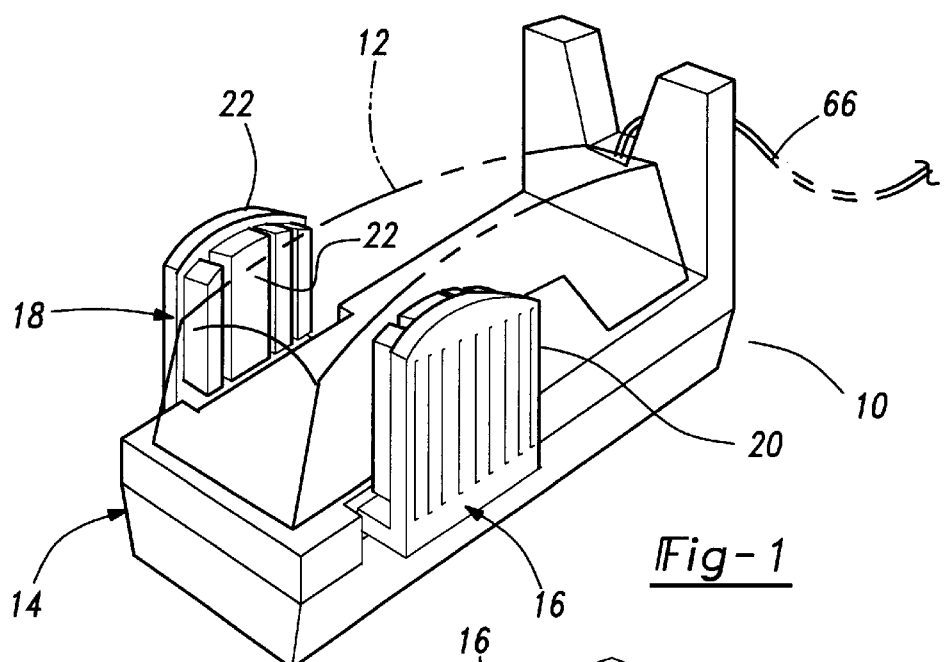
FIG. 1 is a perspective view of the cradle of this invention with a phone shown in phantom being held by the cradle.
Figure 2:
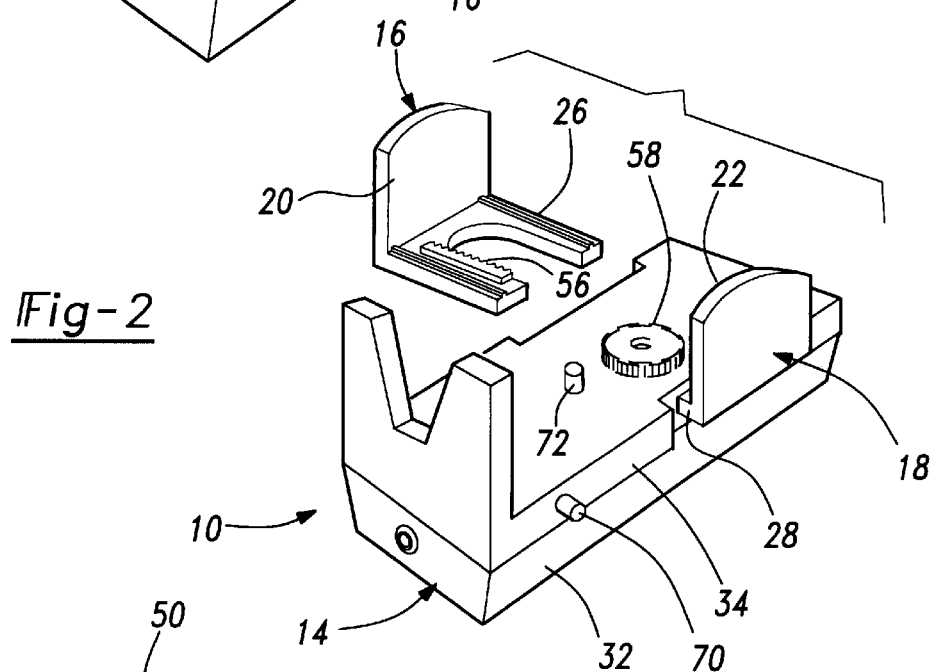
FIG. 2 is a partially exploded perspective view of the cradle of the invention.

Referring to FIGS. 1 and 2, the telephone cradle 10 of this invention is shown holding a portable cellular telephone 12. The phone is supported on the cradle base 14 between two clamping members 16 and 18, at least one of which members 16, is slidable toward and away from the other clamping member 18 to grip and release the phone.

The clamping members 16 and 18 each have an outward extending clamping surface 20 and 22 facing each other and each preferably having a resilient compressible pad 24. In the embodiment illustrated, both clamping members 16 and 18 are slidable to move the clamping surfaces 20 and 22 toward and away from each other. Clamping members 16 and 18 have leg portions 26 and 28 connected to the clamping surfaces 20 and 22 and extending into the base 14 between upper and lower base members 32 and 34.

Figure 4:
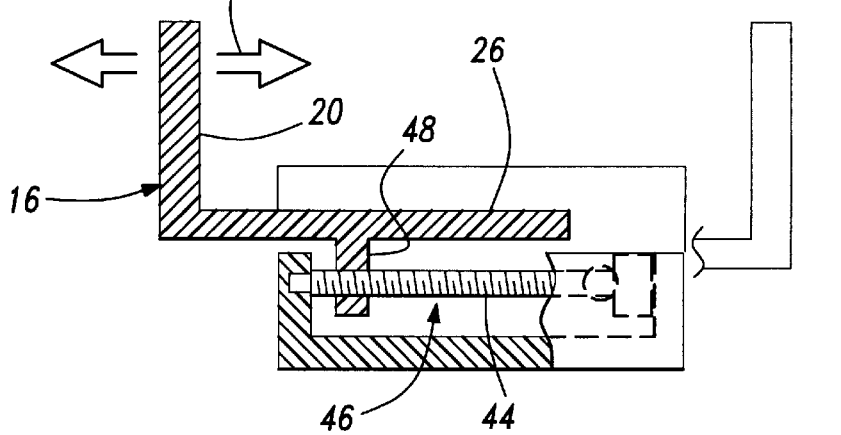
FIG. 4 is a partial cross-sectional view taken along line 4—4 of FIG. 3.
Figure 3:
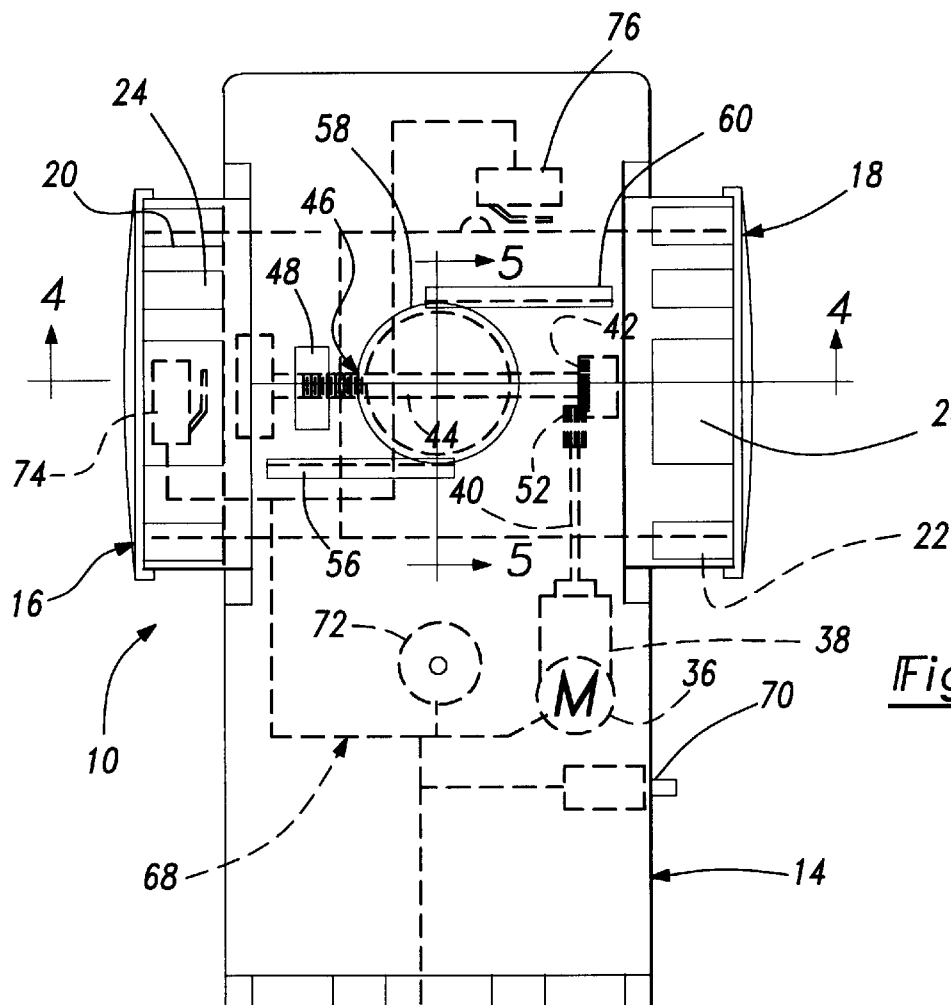
FIG. 3 is a plan view.
Figure 5:
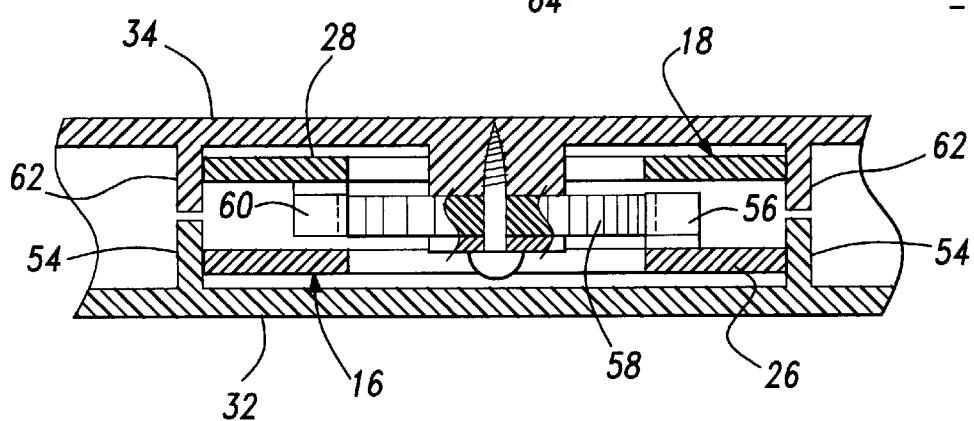
FIG. 5 is a cross-sectional view taken along line 5—5 of FIG. 3.

Referring to FIGS. 3–5, an electric motor 36 is housed in base 14 and is connected to a suitable gear reducer 38. The output shaft 40 of the gear reducer 38 carries a pinion gear 52 in mesh with a ring gear 42 to rotate the screw 44 of screw and nut drive 46. Nut 48 is integral with the leg 26 of clamping member 16 so that as the screw 44 is rotated in opposite directions it will reciprocate the clamping member 16 as shown by the arrows 50 in FIG. 4. The leg portion 26 of clamping member 16 is guided by guide members 54 molded integrally with the lower base member 32 as seen in FIG. 5. In some embodiments the clamping member 16 may be the only moving member with the clamping member 18 remaining stationary.

In the illustrated embodiment where both clamping members 16 and 18 are moved, the leg portion 26 of clamping member 16 carries a rack gear 56 which meshes with and rotates a pinion 58. The pinion 58 meshes with a rack gear 60 on the leg portion 28 of clamping member 18 to reciprocate this member in unison with clamping member 16. The leg portion of 28 of clamping member 18 is guided by guides 62 molded integrally with the upper base member 34.

Power is supplied to the motor 36 from a power supply 64, which may be the vehicle power supply, through a cord 66 to a switching circuit 68, shown in a simplified manner. Power can alternatively be supplied from batteries located in base 14.

In one embodiment, the switching circuit 68 can include a single push button reversing switch 70 mounted on the side of the base 14. Pressing the switch 70 will connect the power supply 64 to the motor 36 to move the clamping members apart. Power can be interrupted by release of the switch button or by pressing the switch a second time. When the phone has been placed on the base 14, the switch 70 can be depressed again to supply power to the motor 36 to move the clamping members toward each other. Reversal of the motor can be accomplished by reversing the plurality of the power supply through the switch. When the phone has been clamped, power to the motor can be interrupted by release of the switch button or by pressing the switch another time.

In another embodiment, the switching circuit can include a second switch 72 located on the upper base member 34. Switch 70 is then used only to move the clamping members apart. When the phone is placed on the base 14, the second switch 72 will be closed to close the clamping members and grip the phone. With this embodiment, a third switch 74 can be supplied in one of the clamping members, shown in clamping member 16 in FIG. 3, to disconnect the power supply when the phone has been gripped. Preferably a fourth switch 76 is also used in this embodiment to disconnect the power supply when the clamping members have been moved to their open position. End wall 78 is provided on base 14 so that the phone 12 can be consistently placed on the base with one end in contact with the wall.

It will be readily apparent that many variations can be made in the switching circuit without departing from the invention being taught.

With reference to FIGS. 6 and 7, an object holder is generally shown at 100. The object holder 100 includes a base 112 and at least two opposing clamping members 120 extending from the base 112. Preferably, the base 112 and clamping members 120 are constructed of a moldable plastic material. At least one of the clamping members 120 moves laterally relative to the base 112 so as to modify the distance d between the members 120. While it is appreciated that both members 120 are optionally movable within the present invention, preferably one clamping member is movable 122 in opposition to stationary clamping member 124. The clamping members 120 are configured to have concave opposing clamping surfaces 128. Optionally, resilient soft pads 130 constructed of a suitable conventional soft plastic material or rubberized material are applied to the concave clamping surfaces 128 by means illustratively including adhesives, pressure sensitive adhesives and thermal fusion. Clamping member 120 of the present invention is configured to grasp a conventional beverage container. One embodiment of the present invention is adapted to grasp a beverage container through the addition of adaptive holding elements 120 having a groove 132 therein. The groove 132 being adapted to receive clamping members of a telephone holder therein. Telephone holders adaptable to receive a beverage container illustratively including those detailed herein; U.S. Pat. No. 5,947,359; and U.S. Pat. No. 5,305,381. In this embodiment of the present invention, the base 112 including mechanisms and means for driving movable holding element 122 are incorporated from the underlying portable telephone holder. While it is appreciated that the present invention readily holds not only a beverage container but also a portable telephone as well.

In another embodiment of the present invention shown in FIG. 8, clamping members 220 are mounted on a lockable pivot pin 221. Clamping members 220 are characterized by each having one concave clamping surface and a second clamping surface 229. The second holding face 229 preferably less sharply curved than concave inner face 228. More preferably, the second surface 229 is generally planar. Preferably, concave surface 228 and second surface 229 are fitted with resilient soft pads as detailed above shown in FIG. 8 at 230 and 231, respectively. The clamping member 220 is rotated about the locking pin 221 to selectively place either concave resilient pad 230 or the second resilient pad 231 towards the interior of the cradle base 212. While opposing complementary faces of the clamping members 220, both being concave is preferred for grasping a generally cylindrical beverage container, it is appreciated that the securing of particular individual articles is facilitated by having a concave surface and a second surface in opposition to one another. The movement of a holding element laterally relative to a base is triggered by switch activation or a user activating a lateral translation element. The movement of a clamping member according to the present invention being driven by electrical power or spring compression as is conventional to the art. All patents, patent applications and publications discussed herein are intended to be incorporated by reference to the same extent as if each was individually and fully incorporated by reference.

What is claimed is:

1. A cradle for holding an object comprising:
   a base;
   a first clamping member pivotally supported on the base and having a first concave clamping surface and a first essentially planar clamping surface such that orientation of the first member clamping surfaces is selectively changed relative to said base, said first clamping member projecting generally outward from said base;
   a second clamping member pivotally supported on said base and having a second concave clamping surface and a second essentially planer clamp surface such that orientation of the second member clamping surfaces is selectively changed relative to said base, said second clamping member projecting generally outward from said base, facing said first clamping member and being slidably supported on said base;
   an energy source supported within said base for sliding said second clamping member relative to said first clamping member; and
   a button connected to said energy source for engaging said energy source.

2. The cradle of claim 1 wherein said energy source is a compressed spring.

3. The cradle of claim 2 further comprising a ratchet adapted to retain said spring in a compressed state, said ratchet being released by engagement of said button.

4. The cradle of claim 1 wherein said energy source is a motor.

5. The cradle of claim 4 further comprising a switching circuit arranged to connect an electrical power supply to said motor to cause said second clamping member to move toward and away from said first clamping member.

6. A cradle for holding a beverage container comprising:
   a hollow base having internal cavity;
   a first clamping member supported on said base and having a concave first clamping surface projecting generally outward from the base;
   a second clamping member having a second concave clamping surface projecting generally outward from said base, facing opposite said first clamping surface, and being slidably supported on said base;
   a motor supported on said base for sliding said second clamping member to move said second clamping surface toward and away from said first clamping surface;
   a switching circuit arranged to connect an electrical power supply to said motor to cause said second clamping member to move toward and away from said first clamping member, said switching circuit comprising a switch means to disconnect the power supply when said beverage container is gripped; and
   said beverage container being held on said base between said first and second clamping member by urging said second clamping member to move toward said first clamping member until said beverage container contacts both said first and second clamping members.

7. The cradle according to claim 6 wherein said first clamping member is slidably supported on said base, and said motor is arranged to move said first and second clamping members toward and away from each other.

8. The cradle according to claim 6 wherein said switching circuit includes a reversing switch.

9. The cradle according to claim 6 wherein said switching circuit comprises a first switch arranged to connect said electrical power supply to said motor to move said second clamping member away from said first clamping member, and a second switch arranged to connect said electrical power supply to said motor to move said second clamping member toward said first clamping member.

10. The cradle according to claim 9 wherein said switching circuit further comprises a third switch arranged to disconnect said power supply to said motor when said second clamping member is being moved toward said first clamping member and said second clamping member contacts a beverage container placed on said base between said first and second clamping member.

11. The cradle according to claim 1 further comprising resilient pads connected to said first and second clamping surfaces.

\* \* \* \* \*

UNITED STATES PATENT AND TRADEMARK OFFICE
CERTIFICATE OF CORRECTION

PATENT NO.    : 6,320,962 B1
DATED         : November 20, 2001
INVENTOR(S)   : Kenneth D. Eisenbraun It is certified that error appears in the above-identified patent and that said Letters Patent is hereby corrected as shown below:

<u>Title page,</u>
Item [56], References Cited, please add the following:
-- 4,852,932    8/1989     Komeya et al.    224/281
   5,060,899   10/1991     Lorence et al.   248/311.2
   5,375,805   12/1994     Sudak et al.     248/311
   5,601,269   12/1997     Jankovic         248/311.2
   5,887,775    3/1999     Sik              224/552
   5,931,431    8/1999     Stinnett         248/313
   5,944,240    8/1999     Honma            224/281
   5,947,359    9/1999     Yoshie           224/570 --

Signed and Sealed this

Third Day of December, 2002

JAMES E. ROGAN
*Director of the United States Patent and Trademark Office*